(12) United States Patent
Mizuta (10) Patent No.: US 8,037,486 B2
(45) Date of Patent: Oct. 11, 2011

(54) DISK DEVICE

(75) Inventor: Yasuhide Mizuta, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 812 days.

(21) Appl. No.: 12/149,574

(22) Filed: May 5, 2008

(65) Prior Publication Data

US 2008/0282269 A1    Nov. 13, 2008

(30) Foreign Application Priority Data

May 8, 2007    (JP) ................. P2007-123258

(51) Int. Cl.
*G11B 17/03*    (2006.01)

(52) U.S. Cl. ........................................ 720/613

(58) Field of Classification Search .......... 720/613, 720/610, 607, 608, 601, 616, 614, 605, 653, 720/611, 676
See application file for complete search history.

(56) References Cited

U.S. PATENT DOCUMENTS

| 7,788,682 B2 * | 8/2010 | Okazaki et al. ............. 720/604 |
| 2004/0139453 A1 * | 7/2004 | Nakamura et al. ............ 720/603 |
| 2004/0158845 A1 | 8/2004 | Iwaasa |
| 2004/0184365 A1 * | 9/2004 | Nasu ........................... 369/43 |
| 2005/0081221 A1 | 4/2005 | Fukasawa |
| 2005/0268311 A1 | 12/2005 | Watanabe et al. |

FOREIGN PATENT DOCUMENTS

| EP | 1 596 386 A2 | 11/2005 |
| EP | 1 635 342 A2 | 3/2006 |
| EP | 1 662 502 A2 | 5/2006 |
| JP | 2003-317357 | 11/2003 |

\* cited by examiner

*Primary Examiner* — Allen Cao (74) *Attorney, Agent, or Firm* — Morgan, Lewis & Bockius LLP (57) ABSTRACT

A slider is mounted on a chassis forming a frame so as to be movable in a first direction, and is configured to start a movement in conjunction with an operation in which an optical pickup is switched from an operation mode into a non-operation mode and returns to an initial position. A disk tray is mounted on the chassis so as to be movable in a second direction perpendicular to the first direction, is configured to move in conjunction with the movement of the slider, and is provided with a first groove extending in the first direction. A protrusion is provided in the slider and is engaged with the first groove when the disk tray moves, thereby preventing the disk tray from moving in the second direction. A second groove is provided in the disk tray, communicates with the first groove, and introduces the protrusion into the first groove when the disk tray is moved. A first drive mechanism is configured to move the disk tray and includes a first pinion provided in the chassis and a first rack provided in the disk tray. The second groove is provided with an opening by cutting a portion of a groove wall of the guide groove.

1 Claim, 7 Drawing Sheets

DISK DEVICE

The disclosure of Japanese Patent Application No. 2007-123258 filed on May 8, 2007 including specification, drawings and claims is incorporated herein by reference in its entirety.

BACKGROUND

The present invention relates to a disk device, and more particularly, to a disk device where an engaging protrusion is engaged with a groove face of an engaging groove provided in a disk tray when a disk tray for taking out and putting in a disk used as a recording medium enters a chassis, thereby preventing the disk tray from being withdrawn from a chassis.

In a disk player that is one of disk devices, a disk has been received from a disk tray onto a turntable or transferred from the turntable to the disk tray by an up-and-down movement of a drive chassis including an optical pickup or a turntable, or the up-and-down movement of the drive chassis has been performed by the reciprocation of a slider in the related art.

Figure 6:
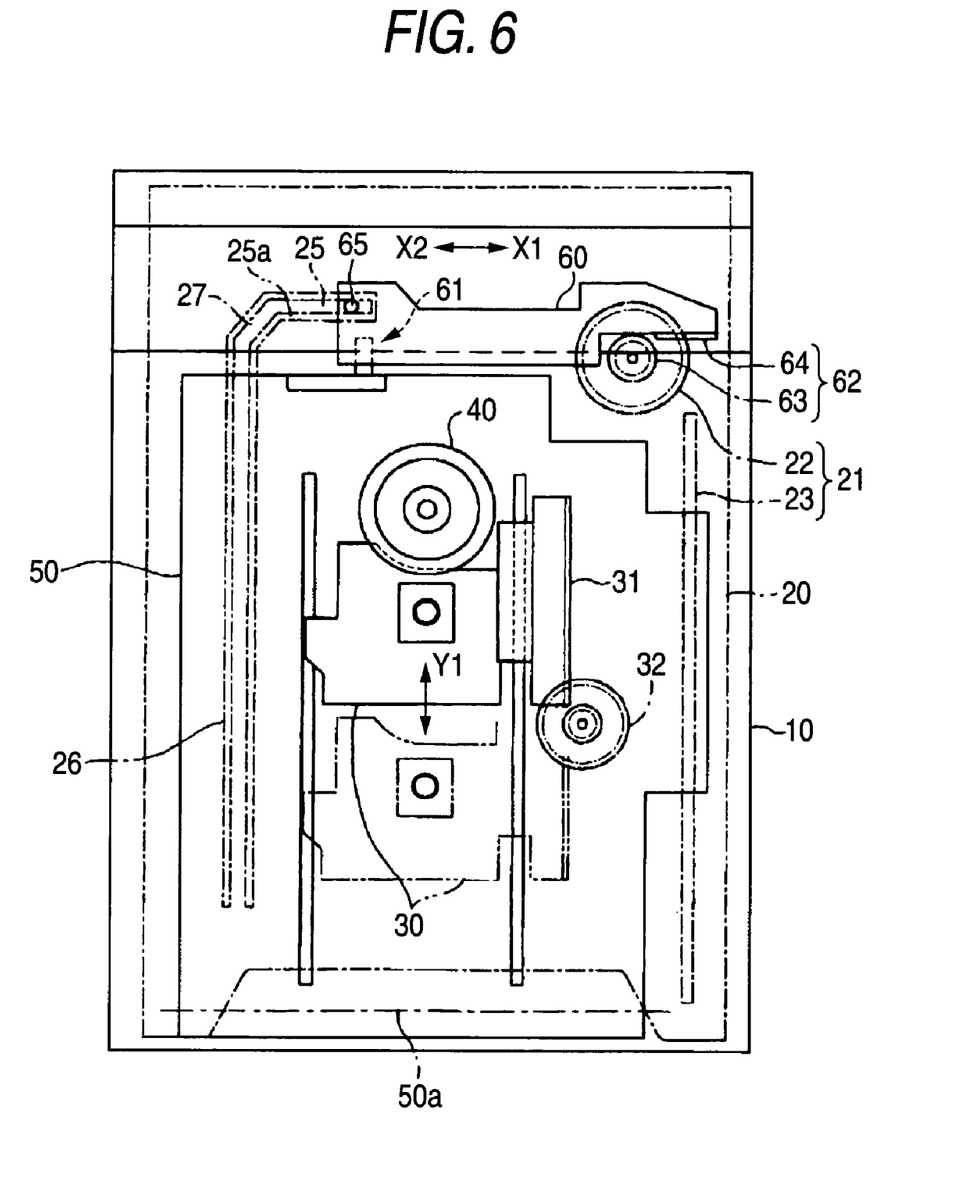
FIG. 6 is a view showing the structure of a related-art disk device.

FIG. 6 is a view showing the basic structure of the disk device. The basic structure of the disk device, the operation thereof, and the like will be described below with reference to FIG. 6.

In FIG. 6, reference numeral 10 indicates a chassis that is formed of a resin-molded body commonly known as a loader chassis, and a disk tray 20 shown by a chain line is assembled into the chassis 10 so as to perform an entrance-withdrawal operation. Further, the supply and discharge of a disk (not shown) to/from the chassis 10 used as a frame can be performed by the entrance-withdrawal operation of the disk tray 20.

A movable chassis 50, which serves as a drive chassis into which an optical pickup 30 and a turntable 40 are assembled, is mounted on the chassis 10. The movable chassis 50 is swung about a fulcrum 50a, which is shown in FIG. 6 by a chain line, with respect to the chassis 10, thereby being moved upward and downward. Further, a slider 60 serving as a cam slider is mounted on the chassis 10 so as to be capable of reciprocating in a width direction X1/X2 of the chassis 10. Furthermore, the slider 60 and the movable chassis 50 are connected to each other by a cam mechanism 61, so that the up-and-down movement of the movable chassis 50 is interlocked with the reciprocation of the slider 60. Specifically, when the slider 60 is moved forward as shown by an arrow X1, the movable chassis 50 is moved upward about the fulcrum 50a by the operation of the cam mechanism 61. In contrast, when the slider 60 is moved backward as shown by an arrow X2, the movable chassis 50 is moved downward about the fulcrum 50a by the operation of the cam mechanism 61. Further, when the movable chassis 50 is moved upward, the turntable 40 receives a disk to be carried by the disk tray 20 and clamps the disk together with a damper (not shown). In contrast, when the movable chassis 50 is moved downward, a clamped state of the disk is released and the disk is then transferred from the turntable 40 to the disk tray 20. Accordingly, the discharge of the disk using the disk tray 20 is provided.

The travel of the optical pickup 30 at the time of an operation mode is performed by transmitting the rotation of a pinion 32 to a rack 31 provided in the optical pickup 30. Meanwhile, the reciprocation of the slider 60 in a direction indicated by arrows X1 and X2 is performed by the operation of a reciprocating drive mechanism 62 that includes a pinion 63 provided in the chassis 10 and a rack 64 provided in the slider 60. Further, in the disk device of FIG. 6, as shown in the drawing, a position where the mesh between the pinion 63 and the rack 64 is released and the rack 63 is separated from the pinion 64 is defined as a forward movement limit position of the slider 60. Furthermore, the shape of a cam groove of the cam mechanism is defined so that the movable chassis 50 is moved upward and the clamped state of the disk is maintained when the slider 60 is pushed and reaches the forward movement limit position.

Meanwhile, a disk device of FIG. 6 is provided with an entrance-withdrawal operation drive mechanism 21 of a disk tray 20, which includes a pinion 22 provided in a chassis 10 and a rack 23 provided in a disk tray 20. The pinion 22 of the entrance-withdrawal operation drive mechanism 21 is integrally resin-molded with the pinion 63, and both pinions 22 and 63 are integrally rotated by a single motor. Further, the rack 23 provided on the back side of the disk tray 20 corresponds to the pinion 22.

In the following description, the pinion 22 and the rack 23 of the entrance-withdrawal operation drive mechanism 21 are referred to as a first pinion 22 and a first rack 23, respectively, and the pinion 63 and the rack 64 of the reciprocating drive mechanism 62 are referred to as a second pinion 63 and a second rack 64, respectively. Accordingly, the pinions 22 and 63 and the racks 23 and 64 of the drive mechanisms 21 and 62 are distinguished from each other.

In addition, the disk tray 20 includes an engaging groove 25 that extends in the width direction X1/X2 of the chassis 10 and a guide groove 26 that extends in the entrance-withdrawal operation direction of the disk tray 20 (a direction orthogonal to the width direction X1/X2), and the guide groove 26 includes an inclined portion 27 communicating with the engaging groove 25. Meanwhile, the slider 60 includes an engaging protrusion 65, and the engaging protrusion 65 is configured to be engaged with the engaging groove 25 or the guide groove 26 so as to slide in the longitudinal direction of the grooves.

Figure 3:
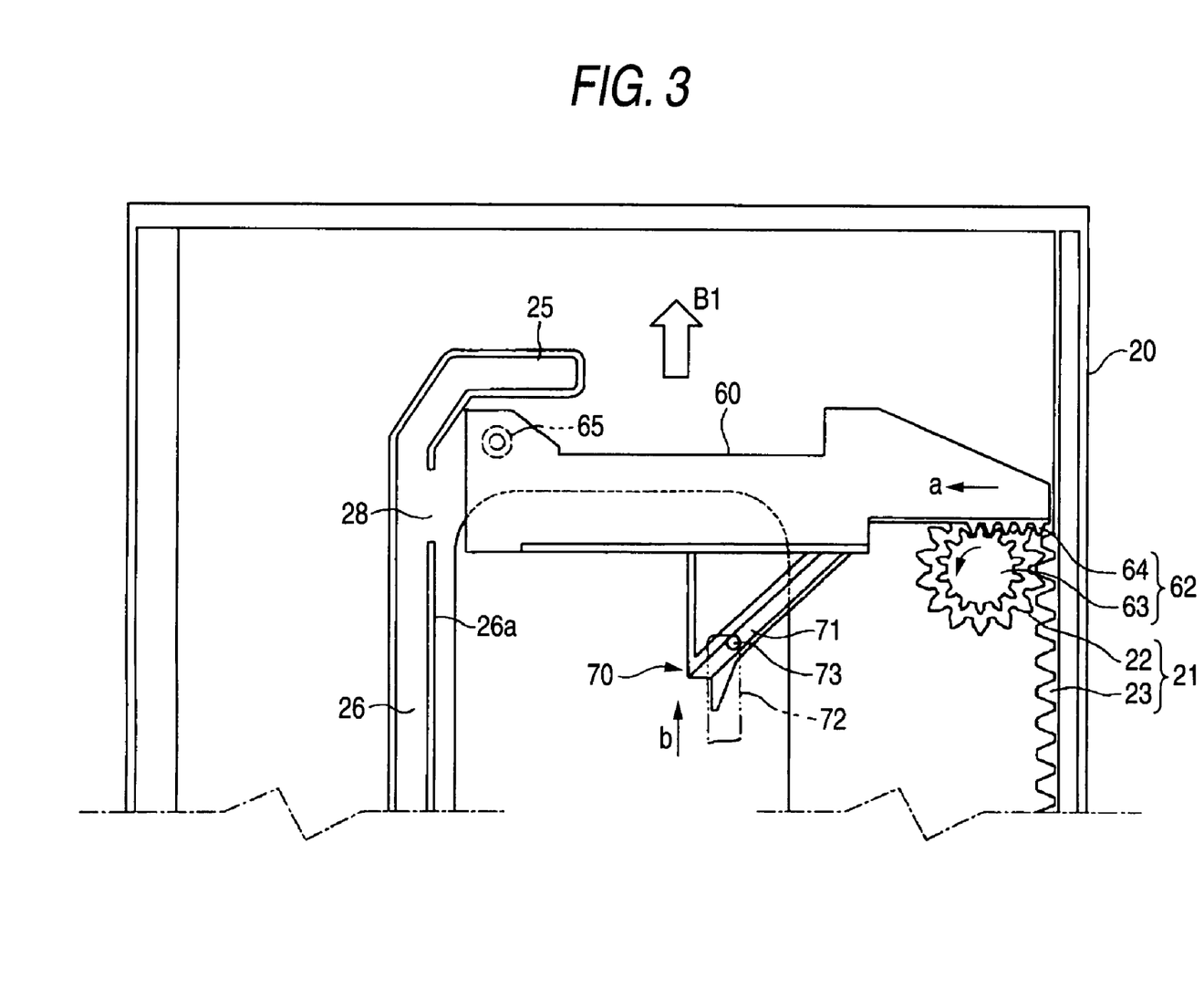
FIG. 3 is a schematic plan view showing an operation when a withdrawal mode of a disk tray is selected.
Figure 4:
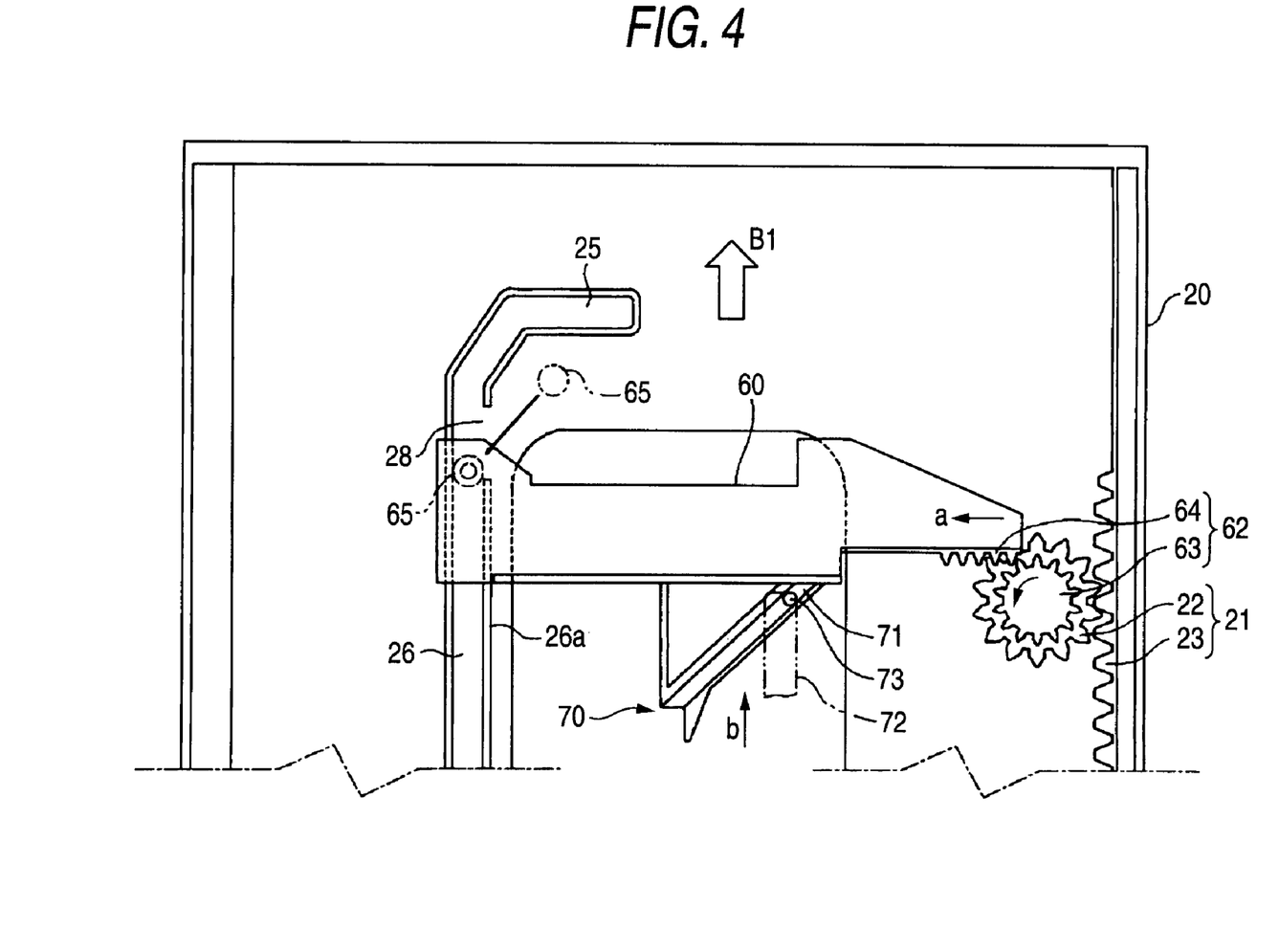
FIG. 4 is a schematic plan view showing an operation where the engaging protrusion is fitted into a guide groove.

In the disk device of FIG. 3, the first rack 23 is separated from the first pinion 22 in an operation mode of the optical pickup 30 so that the rotation of the first pinion 22 is not transmitted to the first rack 23 of the entrance-withdrawal operation drive mechanism 21. Further, when a disk is discharged by the disk tray 20, before the disk tray 20 is withdrawn, the slider 60 is moved backward from the forward movement limit position thereof in a direction indicated by an arrow X2, and the engaging protrusion 65 is introduced into the inclined portion 27 of the guide groove 26 by the backward movement starting operation of the slider 60 so that the disk tray 20 is slightly withdrawn. Accordingly, the first rack 23 of the entrance-withdrawal operation drive mechanism 21 meshes with the first pinion 22.

Figure 7:
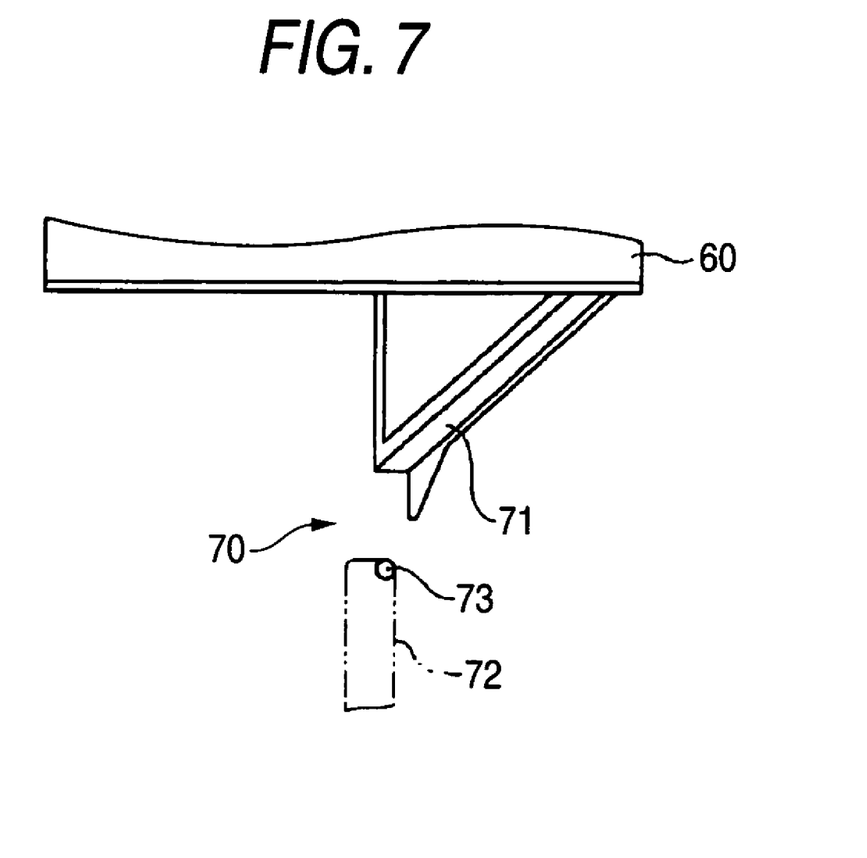
FIG. 7 is a view showing a cam mechanism.

In this case, the disk device is provided with a cam mechanism 70 shown in FIG. 7 in order to perform the backward movement starting operation of the slider 60 by introducing the engaging protrusion 65 of the slider 60 into the inclined portion 27 of the guide groove 26 as described above. The cam mechanism 70 includes an inclined cam groove 71 that is provided in the slider 60, and a cam pin 73 that is provided in a protruding piece 72 extending from the optical pickup 30 (see FIG. 6). When a mode (withdrawal mode) for withdrawing the disk tray 20 is selected, an operation where the mode of the optical pickup 30 is switched from an operation mode to a non-operation mode and the optical pickup thus returns to an initial position as shown by an arrow Y1 in FIG. 6 is performed in accordance with the selecting operation. When the optical pickup 30 returns to the initial position in this way, the cam pin 73 shown in FIG. 7 is moved in the same direction (Y1) as the optical pickup 30 in accordance with the return and enters the cam groove 71. Then, the cam pin pushes the cam groove 71 in a direction indicated by the arrow X2 of FIG. 6, so that the backward movement starting operation of the slider 60 is performed.

Consequently, the operation where the mode of the optical pickup 30 is switched from the operation mode to the non-operation mode and the optical pickup thus returns to the initial position, the backward movement starting operation of the slider 60, and the initial movement operation of the disk tray 20 in the withdrawal direction following the backward movement starting operation of the slider 60 are connected and performed as a series of operations. In addition, the first pinion 22 and the second pinion 63 are integrally rotated by a single motor. Therefore, when the disk tray 20 is initially moved, the slide 60 continues the backward movement starting operation in connection with the initial movement of the disk tray.

Further, when the slider 60 is pushed to the backward movement limit position thereof by the second pinion 63 that meshes with the second rack 64, the second rack 64 is separated from the second pinion 63 and the engaging protrusion 65 exits from the inclined portion 27 of the guide groove 26. For this reason, the disk tray 20 continues the withdrawal operation by the rotation of the second pinion 22 that meshes with the first rack 23 of the disk tray 20, and the engaging protrusion 65 slides in the longitudinal direction of the guide groove 26 during the withdrawal operation.

In the disk device shown in FIG. 6, the guide groove 26 introduces the engaging protrusion 65 into the engaging groove 25 at the time of the entrance operation of the disk tray 20. Further, the engaging protrusion 65 introduced into the engaging groove 25 is engaged with a groove face 25a of the engaging groove 25, thereby preventing the disk tray 20 from being withdrawn from the chassis 10.

Meanwhile, in the related art, there has been proposed a disk device that includes a countermeasure to prevent a disk tray from accidentally protruding when an impact is applied (or example, see Patent Document 1). Patent Document 1 discloses a separation preventing unit for preventing a guide pin, which is guided by a guide rail mounted on a disk tray, from being separated form the guide rail.

Patent Document 1: Japanese Patent Publication No. 2003-317357A1

In the disk device having the basic structure that has been described with reference to FIG. 6, if a strong impact is applied to the disk tray 20 due to some reasons during a stop mode where the disk tray 20 is maintained to enter the chassis 10, there may occur a case that the engaging protrusion 65 is disengaged from the engaging groove 25.

When the above-mentioned case occurs, the engaging groove 25 is displaced to the front side of the engaging protrusion 65 (front side in the withdrawal direction of the disk tray 20). Accordingly, the disk tray 20 is initially moved in the withdrawal direction. In this state, the second pinion 63 and the rack 64 of the reciprocating drive mechanism 62 of the slider 60 are separated from each other. For this reason, when a play mode, a disk withdrawal mode, or a disk entrance mode is selected, the slider 60 is not operated normally. In some cases, mechanical components of the disk tray 20 or the slider 60 are locked, so that there may occur a case that the disk tray 20 cannot be withdrawn. Further, when the disk tray 20 cannot be withdrawn, it is not possible to meet user's request.

SUMMARY

Accordingly, it is an object of the invention to provide an disk device that can withdraw a disk tray even though an engaging protrusion and an engaging groove are disengaged from each other, and includes a countermeasure to make an engaging protrusion be naturally fitted into a guide groove by withdrawing the disk tray, thereby normally performing an operation thereafter.

In order to achieve the above objects, according to an aspect of the invention, there is provided a disk device comprising: a slider which is mounted on a chassis forming a frame so as to be movable in a first direction between a first position and a second position, and is configured to start a movement from the first position toward the second position in conjunction with an operation in which an optical pickup is switched from an operation mode into a non-operation mode and returns to an initial position; a disk tray which is mounted on the chassis so as to be movable in a second direction substantially perpendicular to the first direction between a third position and a fourth position, is configured to move from the third position toward the fourth position in conjunction with the movement of the slider, and is provided with a first groove extending in the first direction; a protrusion which is provided in the slider and is engaged with the first groove when the disk tray moves to the third position, thereby preventing the disk tray from moving from the third position to the fourth position; a second groove which is provided in the disk tray, communicates with the first groove, and introduces the protrusion into the first groove when the disk tray is moved from the fourth position to the third position; and a first drive mechanism which is configured to move the disk tray and includes a first pinion provided in the chassis and a first rack provided in the disk tray, wherein the first rack is separated from the first pinion when the disk tray is positioned at the third position, and the first rack is engaged with the first pinion when the disk tray starts moving from the third position toward the fourth position; wherein the second groove is provided with an opening by cutting a portion of a groove wall of the guide groove so that the protrusion is introduced into the second groove through the opening when the disk tray moves from the third position toward the fourth position in conjunction with the movement of the slider in a case where the protrusion is disengaged from the first groove.

According to this structure, if the first pinion is rotated when the protrusion is disengaged from the engaging groove, the rotation thereof is transmitted to the first rack, so that the disk tray is withdrawn from the chassis. Therefore, it is possible to withdraw the disk tray from the chassis. Further, the slider starts the movement from the first position toward the second position in conjunction with the operation in which the optical pickup returns to the initial position, so that the protrusion is introduced into the second groove through the opening. Therefore, an operation of the disk device is normally performed thereafter, so that the state in which the protrusion is disengaged from the first groove is restored.

The disk device may further comprise a second drive mechanism which is configured to move the slider and includes a second pinion which is integrally rotatable with the first pinion and a second rack provided in the slider, wherein the second rack is separated from the second pinion when the slider is positioned at the first position, and the second rack is engaged with the second pinion when the slider starts moving from the first position toward the second position; and wherein when the protrusion is introduced into the second groove through the opening the slider is positioned at the second position and the second rack is separated from the second pinion.

As described above, in the disk device according to the aspect of the invention, even if the protrusion is disengaged from the first groove, a user can restore the disengagement state to a normal state just by selecting a withdrawal mode of the disk tray.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE EMBODIMENTS

Hereinafter, an exemplary embodiment of the invention will be described with reference to the accompanying drawings The basic structure of a disk device according to this embodiment and the operation thereof are the same as described with reference to FIG. 6.

Figure 1:
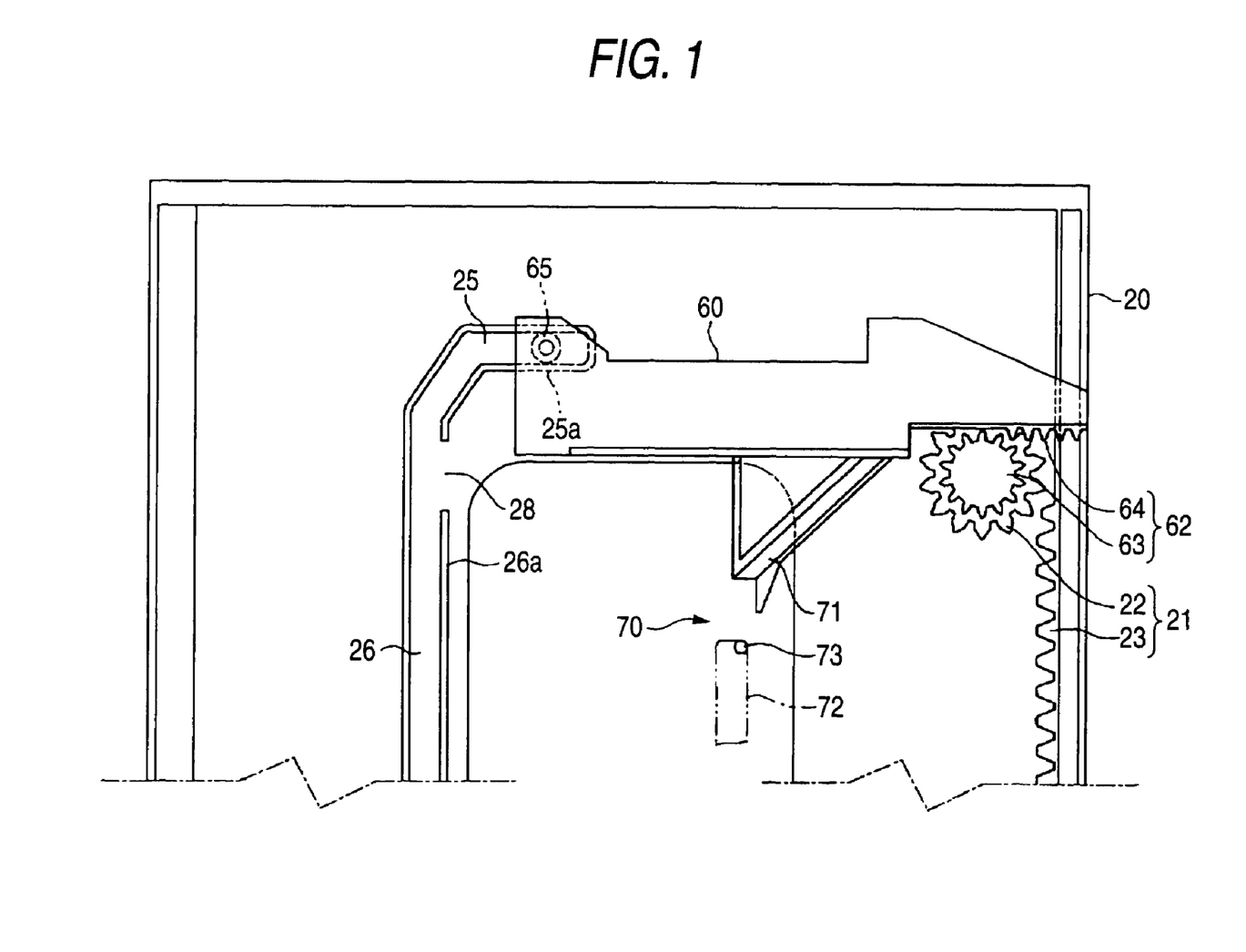
FIG. 1 is a schematic plan view of a disk device according to an embodiment of the invention.

That is, when a slider 60 reaches a forward movement limit position as shown in FIG. 1, an engaging protrusion 65 is fitted into an engaging groove 25 and engaged with a groove face 25a thereof. Accordingly, the engaging protrusion is not withdrawn from a chassis 10 (see FIG. 6, hereinafter, same as above) of a disk tray 20. Further, in this case, a second rack 64 of a reciprocating drive mechanism 62 is separated from a second pinion 63. In addition, the disk tray 20 enters the chassis 10, and a first rack 23 of an entrance-withdrawal operation drive mechanism 21 is separated from a first pinion 22. Meanwhile, in this state, an optical pickup 30 (see FIG. 6, hereinafter, same as above) stops in front of an initial position thereof.

Figure 2:
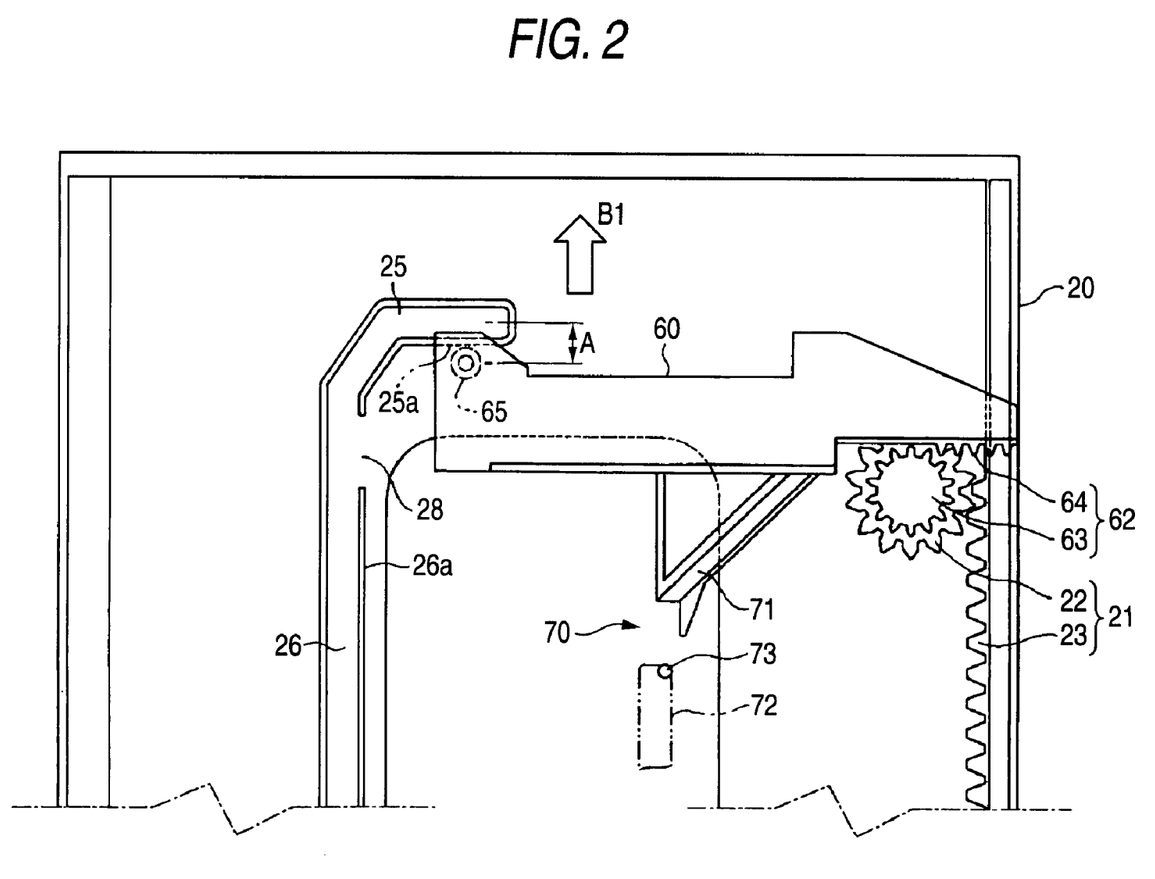
FIG. 2 is a schematic plan view of the disk device shown in FIG. 1 showing that an engaging protrusion is disengaged from an engaging groove.

If a strong impact is applied to the disk tray 20 or the like when the state shown in FIG. 1 is maintained, the engaging protrusion 65 is disengaged from the engaging groove 25 as shown in FIG. 2. When the engaging protrusion 65 is disengaged from the engaging groove 25 as described above, the disk tray 20 is moved in a withdrawal direction B1 by a width represented by reference character A so that a groove face 25a of the engaging groove 25 passes over the engaging protrusion 65. In this embodiment, the width A, where the disk tray 20 is moved in the withdrawal direction when the engaging protrusion 65 is disengaged from the engaging groove 25, is set to a width where the first rack 23 of the entrance-withdrawal operation drive mechanism 21 meshes with the first pinion 22, that is, a width where the above-mentioned initial movement is performed.

For example, when a user selects an operation for withdrawing the disk tray 20, that is, a withdrawal mode of the disk tray 20 from the state of FIG. 2, the optical pickup 30 performs an operation for returning to an initial position due to the selection. Then, due to the operation, a cam pin 73 of a cam mechanism 70 is fitted into a cam groove 71 as shown by an arrow b of FIG. 3, and presses the cam groove 71. Accordingly, the slider 60 begins to perform a backward movement in which the forward movement limit position is used as a starting point. Due to the backward movement starting operation of the slider 60, the second rack 64 meshes with the second pinion 63 of the reciprocating drive mechanism 62. For this reason, as shown by an arrow a of FIG. 3, the backward movement starting operation of the slider 60 is performed in connection with the operation where the optical pickup 30 returns to the initial position. Therefore, the withdrawal operation of the disk tray 20 and the backward movement starting operation of the slider 60 are performed together with each other.

In this case, as shown in FIGS. 1 to 5, an opening 28, which is formed by cutting a portion of a groove face 26a of a guide groove, is formed in a guide groove 26. The withdrawal operation of the disk tray 20 and the backward movement starting operation of the slider 60 are performed together with each other as described above, so that the engaging protrusion 65 is moved as shown by an arrow c of FIG. 4 and is introduced into the guide groove 26 from the opening 28.

Figure 5:
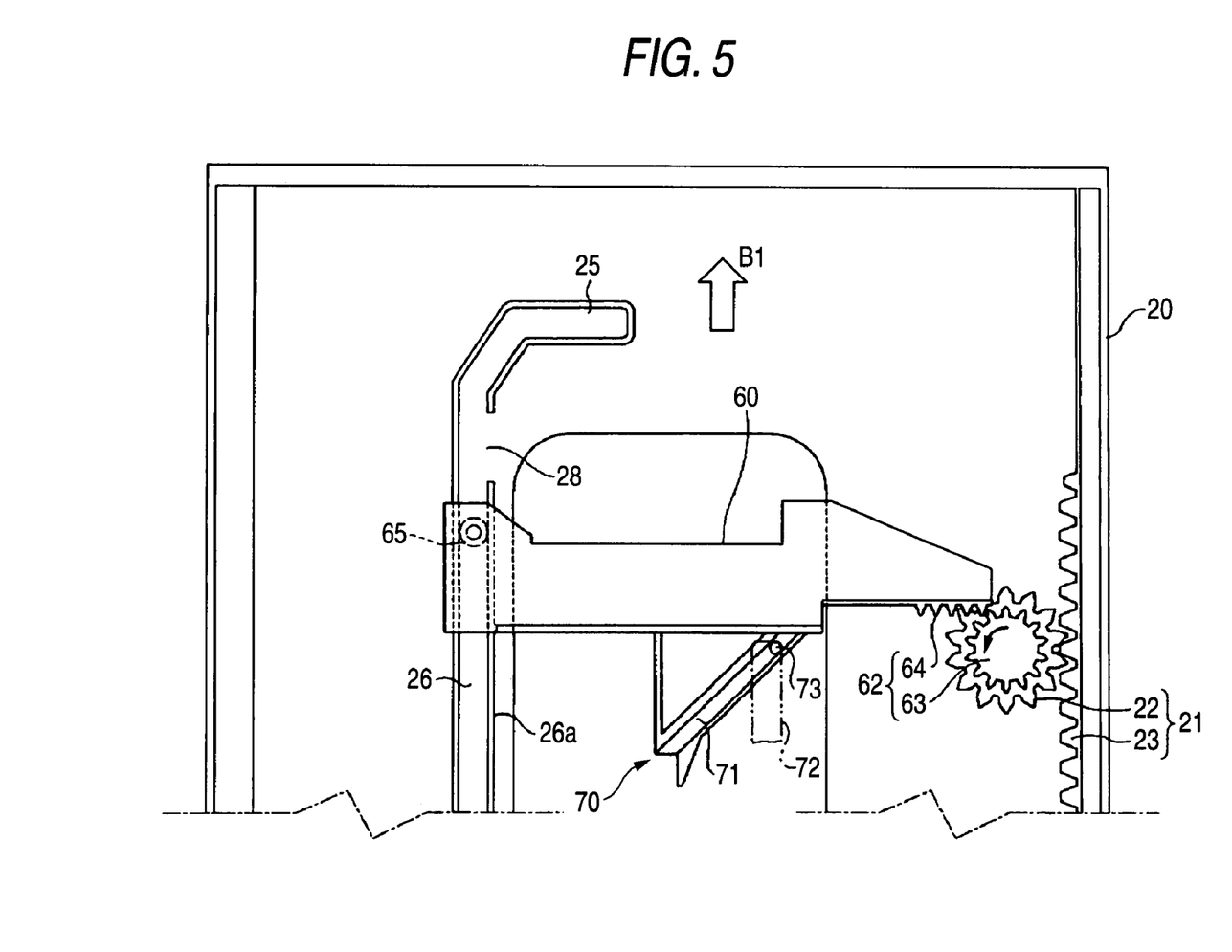
FIG. 5 is a schematic plan view showing a withdrawal operation of the disk tray.

If the engaging protrusion 65 is introduced into the guide groove 26 in this way, the engaging protrusion 65 is normally fitted into the guide groove 26 thereafter as shown in FIG. 5. Therefore, the state in which the engaging protrusion 65 is disengaged from the engaging groove 26 is restored. Further, when the engaging protrusion 65 is introduced into the guide groove 26, the second rack 64 is pushed by the second pinion 63 and thus separated from the second pinion 63 and the slider 60 reaches the backward movement limit position.

Other structures and the operation of this embodiment are the same as described with reference to FIGS. 6 and 7.

In this embodiment, as the disk tray 20 is withdrawn, the engaging protrusion 65 disengaged from the engaging groove 25 is introduced into the guide groove 26 by the structure where the opening 28 is formed by cutting a portion of the groove face 26a of the guide groove 26 at a predetermined position. Therefore, the engaging protrusion 65 disengaged from the engaging groove 25 is automatically restored to a normal position without adding separate parts. For this reason, there is no concern that mass productivity deteriorates on an assembly line of a disk device.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A disk device comprising:
  a slider which is mounted on a chassis forming a frame so as to be movable in a first direction between a first position and a second position, and is configured to start a movement from the first position toward the second position in conjunction with an operation in which an optical pickup is switched from an operation mode into a non-operation mode and returns to an initial position;
  a disk tray which is mounted on the chassis so as to be movable in a second direction substantially perpendicular to the first direction between a third position and a fourth position, is configured to move from the third position toward the fourth position in conjunction with the movement of the slider, and is provided with a first groove extending in the first direction;

a protrusion which is provided in the slider and is engaged with the first groove when the disk tray moves to the third position, thereby preventing the disk tray from moving from the third position to the fourth position;

a second groove which is provided in the disk tray, communicates with the first groove, and introduces the protrusion into the first groove when the disk tray is moved from the fourth position to the third position;

a first drive mechanism which is configured to move the disk tray and includes a first pinion provided in the chassis and a first rack provided in the disk tray, and a second drive mechanism which is configured to move the slider and includes a second pinion which is integrally rotatable with the first pinion and a second rack provided in the slider, wherein the first rack is separated from the first pinion when the disk tray is positioned at the third position, and the first rack is engaged with the first pinion when the disk tray starts moving from the third position toward the fourth position;

wherein the second groove is provided with an opening by cutting a portion of a groove wall of the guide groove so that the protrusion is introduced into the second groove through the opening when the disk tray moves from the third position toward the fourth position in conjunction with the movement of the slider in a case where the protrusion is disengaged from the first groove;

wherein the second rack is separated from the second pinion when the slider is positioned at the first position, and the second rack is engaged with the second pinion when the slider starts moving from the first position toward the second position; and wherein when the protrusion is introduced into the second groove through the opening the slider is positioned at the second position and the second rack is separated from the second pinion.

* * * * *